UNITED STATES PATENT OFFICE 1,986,692

FIREPROOF CONSTRUCTION MATERIAL

Bruno Ullrich, Hamburg, Germany, assignor to Heinrich August Steines, Gross-Flottbek, near Hamburg, Germany No Drawing. Application July 10, 1933, Serial No. 679,827. In Germany August 2, 1932

14 Claims. (Cl. 106—29)

The invention concerns a fireproof construction material.

Mixtures of magnesium chloride with calcined magnesite and filling materials, the so-called Sorel or wood cement have already been employed for construction purposes. However, it has appeared that this Sorel cement is not flame and fire proof since in the hot condition it warps and distorts and splits apart, sometimes with sharp cracking noises or reports.

According to the invention, a fireproof construction material is provided in which for the compounding a magnesium chloride solution to which has been added a weak aromatic acid such as salicylic acid is employed. Moreover, the filling materials are in known manner soaked in a paraffin solution and/or mineralized with lime water.

The following mixture according to the invention has, for example, been found suitable, more particularly for the production of building sheets.

Finely crystallized magnesium chloride is dissolved in water to a solution of 35° Bé. A ready prepared magnesium chloride solution of this concentration can be employed. Thereupon, to this solution there is added so much aqueous salicylic acid that for 100 kgs. of magnesium chloride solution about 100 to 250 g. salicylic acid is present.

In a separate vessel 250 grams of green, glycerine-containing soap is dissolved in 11 litres of warm water and this soap solution is added to the magnesium chloride solution containing salicylic acid until the mixture attains a density of 30° Bé. The mixture is thoroughly stirred until practically all the solid portions and crystals have gone into solution. Thereupon it is allowed to remain undisturbed for about 5 days in order that the suspended materials can separate therefrom. After complete clarification the clear solution existing above the lower layer is removed. This serves as the compounding constituent of the construction material according to the invention.

For the production of sheets or the like, wood meal, for example, is steeped in a solution of paraffin in an organic solvent material and the solvent material allowed to evaporate. After setting aside for about 24 hours, the sawdust so prepared is intimately admixed with a suitable filling material, for example with asbestos meal, pumice dust and the like and with calcined magnesite. For example, for 1 kg. of wood meal 0.5 kg. of pumice dust, 0.5 kg. of asbestos meal and 1.5 kg. of a high grade, pure calcined magnesite may be used.

4 kg. of the thoroughly dried mixture are now stirred to a homogeneous paste of a suitable consistency with the above described clarified liquid. The mixture so obtained may be employed for the production of sheets.

Also the mixture according to the invention can be coated upon a foundation, for example plastered on or provided as a protecting coating. For this purpose a foundation is first obtained in which large saw chips are first steeped with milk of lime, and thereupon dried. 2 kgs. of the prepared or mineralized chips are thereupon moistened with 1 kg. of the clarified magnesium chloride solution containing salicylic acid and the mixture intimately incorporated thereupon with 1.5 kg. of a high grade, pure calcined magnesite. Then a further 1 kg. of liquor is added and the mixture well worked together.

The sheet mould is now filled with the foundation material so produced, and in such manner that the filling material extends about half the sheet thickness above the edge of the mould. The foundation material is then pressed together or stamped to sheet thickness so that the mould is evenly filled.

After about 16 hours the mass is set and the sheet can already be removed therefrom, and is brought to complete hardness and dryness in vertical frames set up in air-drying chambers.

By the steeping of the wood meal with paraffin and the mineralization of the saw chips and the addition of the glycerine-containing soap lye in combination with the acidification with salicylic acid, it is attained that the sheets produced are water-repellent and that it no longer warps. After about 12 hours' drying in the air the sheets are finished. They show a smooth surface which after the drying can be highly polished by rubbing with a cloth or the like, so that the outer surface of the sheet gives the impression of a glaze.

The construction sheet so obtained may be sawn, screwed and nailed and above all may be used anywhere where hitherto construction sheets of known composition have been employed. The construction sheets of the material according to the invention have in particular the advantage that they are flame and fire proof. The officially conducted investigations have shown that the material according to the invention conforms in every way to the official regulations in regard to fire.

Instead of salicylic acid also other organic aromatic acids can be employed and also such acids as contain a benzene ring.

For the production of the material according to the invention, also other suitable filling materials such as cork fragments, rice husks, animal or vegetable fibrous materials, subdivided mineral materials of all kinds, also in mixture with other hydraulic binding materials such as as Portland cement, lime mortar and the like, and in mixture with sand and the like may be employed.

For the production of light weight sheets with the use of cork fragments as filling materials the cork fragments in finely granular condition are first mineralized with milk of lime, and after the drying, a mixture of 1 kg. of cork fragments, 0.5 kg. of a high grade, pure calcined magnesite and 3 kg. of magnesium chloride solution according to the invention is produced. The sheet moulds are also over-filled to about the extent of one-quarter of the sheet thickness, the mass is pressed together and the hardening and binding and drying allowed to take place in known manner.

In a similar manner according to the invention fireproof light weight sheets may be produced from wood wool or other suitable raw materials. Thus, for example, the wood wool, which preferably is soaked in a paraffin solution, after drying is drawn through or steeped in a liquid mixture of 1 kg. of a high grade, pure calcined magnesite, 1 kg. of asbestos meal and 4 kg. of magnesium chloride solution according to the invention or steeped with a suspension thereof. After draining or the pressing out of the excess liquid, the so-treated wood wool is transferred to moulds and pressed. The set sheet can also be provided with a glazed coating layer of fireproof material according to the invention. The light weight sheets so produced show a very considerable insulating capacity against sound and heat, the shavings are elastic and not brittle as in the known wood wool light weight sheets, and they show an extraordinary degree of fireproof and flameproof character.

It has been found that the addition of alumina-containing filling materials increases the fire-resistance of the materials according to the invention and that alumina-containing minerals are also of advantage in the setting and in the working up of the material and that they induce a greater strength and a noticeable flexibility.

The material according to the present invention may also be employed as a fire-resisting coating material.

The material according to the invention is not limited to the examples given. It has been shown that they can be employed with advantage for the production of fireproof and flameproof domestic furniture, cabinets, for example for boxes for the fireproof storage of cinema films and the like. The material can also be employed for the production of structures, as floor coverings both as foundation layer and also for the finishing layer. They may also serve for covering or for the plastering of walls, ceilings and the like, as fire-resisting coatings for safes, for the production of fire-resistant doors, for the covering of beams and joists, for window sills, for keystone and other purposes, wherewith a non-warping material with a smooth glazed surface is required, for the production of sound and heat insulating walls, for the manufacture of easily workable constructive material and above all for the production of a practically complete fire- and flame-resistance.

To avoid the ignition of readily ignitable substances many materials have been proposed. In part the substances were steeped in a bath of these materials or were painted with the flame-preventing material. The action of the known flame-preventing material consists in that they develop flame-destroying oxygen-free gases and that they form a readily meltable glassy coating on the object. For a long time boric acid, phosphoric acid, tungstic acid, alkali silicates, ammonium salts, alum or other aluminium compounds, asbestos, barium sulphate, lead sulphate, calcium iron, nickel titanium, zinc tungsten, and magnesium salts have been proposed for impregnating or as paints for protection against fire.

Also magnesium chloride has been used with calcium chloride and salammoniac as well as magnesium sulphate for the impregnation of wood or fabrics.

According to the invention a fireproofing paint is provided in which magnesium chloride is employed together with a small proportion of a weak aromatic acid such as salicylic acid in aqueous solution.

This mixture is preferably stirred with calcined magnesite and/or suitable filling or colouring materials to a coatable mass and painted on to the object to be rendered fireproof.

According to the invention a fire-resisting material is, for example, constituted in the following manner:

Finely crystalline magnesium chloride is dissolved in pure water to a solution of 35° Bé. Also a ready prepared pure magnesium chloride solution can be employed. To this solution a small proportion of salicylic acid is introduced, preferably such that for 100 kg. magnesium chloride of 35° Bé., about 250 grams of salicylic acid is added. In a separate container, 250 grams of green glycerine-containing soap is dissolved in 11 litres of warm water and this soap solution is introduced into the magnesium chloride solution until the mixture has attained a density of 30° Bé.

The magnesium chloride-soap solution mixture is then stirred until the complete solution of the crystals is effected and the liquor so obtained is allowed to stand without disturbance for about 5 days, in order that it may clear, and solid or suspended materials settle out therefrom. After the clarification of the liquor, the clear liquid is decanted from the bottom layer. The solution obtained serves for the production of flame-resisting paint according to the invention.

A mixture for example of the following composition is now prepared:

| | Grams |
|---|---|
| High grade, pure calcined magnesite | 1500 |
| High grade, pure alumina | 400 |
| Mineral colour | 100 |

These raw materials in powder form are admixed in a suitable mixing machine intimately and the mixture stored with the complete exclusion of air.

For the production of a fire-resisting painting material according to the invention about 2250 kg. of the clarified liquor are stirred together with about 2750 kg. of the pulverized mineral mixture to a paintable mass shortly before use. The mixture can be employed immediately to render fire-resisting wood, stone and the like.

Prior to the application of the paint, it is preferable to prepare and to clean the underlayer. For a satisfactory adherence of the paint it is necessary that the underlayer is damp and that there are no loose parts or grains thereon. Cleaning with water or with dilute hydrochloric acid has been found to be particularly suitable. planed wood must be rendered thoroughly moist, and preferably prior to painting is roughened. Wood which is partly weathered in the open must be thoroughly washed. The paint only adheres badly to oil colours and the like.

The paint material according to the invention must, during the production, be continually well stirred up in order that the mineral materials do not separate and the production must be effected as rapidly as possible.

The painting may be achieved with a painter's brush. The paint shows a dirty grey ground tone. It can also, however, be obtained in white or in coloured forms by addition of corresponding colouring bodies such as zinc white, chrome green and the like.

It is recommended to provide the paint on its outer surface with an oil colour paint when a particularly attractive finish is required. By this oil colour coating the flame-resistant action does not come into question as it has been shown that the oil of the oil colour is absorbed by the fire-resisting material according to the invention, and that the oil colour film on burning simply chars and scales off without burning.

The flame-resisting paints according to the invention are not limited to the example described. Instead of salicyclic acid also other weak aromatic acids such as benzoic acid, phthalic acid and the like can be employed and in place of aluminium and mineral colours also other filling materials and colouring bodies can be added.

It is recommended that the fire-resistant paint be given such a consistency that it may be applied evenly and has the same viscosity as oil colour. The paint may serve preferably for the coating of wood constructions in buildings for example in theatres, of vehicles, of materials, fabrics and furniture and house furnishings of all kinds, of buildings, boxes, for the coating of beams and for rendering fireproof linoleums, paper and straw and many other working materials.

I claim:—

1. Process for the production of fireproof material which includes adding a weak aromatic acid to an aqueous solution of magnesium chloride containing calcined magnesite.

2. Process for the production of fireproof material which includes adding a weak aromatic acid to an aqueous solution of magnesium chloride containing calcined magnesite and filling materials.

3. Process for the production of fireproof material which includes adding salicylic acid to an aqueous solution of magnesium chloride containing calcined magnesite and filling materials.

4. Process for the production of a fireproof material which includes adding a weak aromatic acid to an aqueous solution of magnesium chloride containing calcined magnesite, producing independently an aqueous solution of soap, adding said aqueous solution of soap to said first mentioned solution to produce a product of determined density.

5. Process for the production of a fireproof material which includes adding a weak aromatic acid to an aqueous solution of magnesium chloride containing calcined magnesite producing independently an aqueous solution of soap, together with glycerine, adding said aqueous solution of soap to said first mentioned solution to produce a product of determined density.

6. Sheet construction material comprising organic material in mineralized condition incorporated with a weak aromatic acid, magnesium chloride and calcined magnesite in aqueous mixture, the mixture being set and dried in sheet form.

7. Sheet construction material comprising organic material by steeping in calcium hydrate, incorporated with a weak aromatic acid, magnesium chloride together with calcined magnesite in aqueous mixture, the product being set and dried in sheet form.

8. Sheet building material of fireproof character comprising organic filling material impregnated with paraffin admixed with a weak aromatic acid, magnesium chloride and calcined magnesite in aqueous mixture, and subsequently moulded, set and dried.

9. Process for the production of fireproof construction sheets which includes producing a magnesium chloride solution of density 35° Bé., adding thereto a weak aromatic acid, allowing the solution to stand in order to clarify, admixing the clarified solution with calcined magnesite and filling materials, moulding the said mixture, setting and drying the same.

10. Process for the production of fireproof construction sheet which includes adding a weak aromatic acid to a magnesium chloride solution followed by the addition of a glycerine-containing soap solution, calcined magnesite and filling material comprising organic constituents, the mixture being moulded, set and dried.

11. A fireproof paint comprising an aqueous magnesium chloride solution admixed with calcined magnesite, weak aromatic acid, a filling material and a colouring material.

12. Fireproof coating material comprising an aqueous solution of magnesium chloride containing salicyclic acid, calcined magnesite, fillers and colouring materials.

13. Fireproof coating material comprising magnesium chloride in aqueous solution, admixed with soap in solution, a weak aromatic acid, calcined magnesite fillers and colours.

14. A fireproof material produced from aqueous magnesium chloride admixed with a weak aromatic acid, calcined magnesite, and a filler comprising alumina.

BRUNO ULLRICH.